United States Patent
Burg et al.

[11] 3,913,661
[45] Oct. 21, 1975

[54] LOW PRESSURE STORAGE OF METABOLICALLY ACTIVE MATERIAL WITH OPEN CYCLE REFRIGERATION

[75] Inventors: Stanley P. Burg, Miami, Fla.; William J. Hentschel, Acton, Mass.

[73] Assignee: Grumman Allied Industries Inc., Garden City, N.Y.

[22] Filed: Mar. 26, 1974

[21] Appl. No.: 454,825

Related U.S. Application Data

[62] Division of Ser. No. 215,688, Jan. 5, 1972, Pat. No. 3,810,508.

[52] U.S. Cl. .................. 165/3; 62/268; 165/19; 165/30; 165/63
[51] Int. Cl. ............................................. F24f 3/14
[58] Field of Search ............ 165/1, 2, 3, 19, 30, 60, 165/63; 62/268, 269, 270; 426/419; 99/154

[56] References Cited
UNITED STATES PATENTS

| | | | |
|---|---|---|---|
| 2,110,689 | 3/1938 | Woodard | 62/268 |
| 2,273,108 | 2/1942 | Hibberd | 62/269 |
| 2,579,512 | 12/1951 | Perrine | 62/268 |
| 2,671,643 | 3/1954 | Gordon | 165/63 |
| 2,923,629 | 2/1960 | Bonomi | 99/154 |
| 3,067,312 | 12/1962 | McFarlane | 165/30 |
| 3,080,725 | 3/1963 | Cowley | 165/30 |
| 3,125,863 | 3/1964 | Hood | 165/63 |
| 3,260,512 | 7/1966 | Claessens | 165/66 |
| 3,333,967 | 8/1967 | Burg | 426/419 |
| 3,474,221 | 10/1969 | Jason | 165/30 |

FOREIGN PATENTS OR APPLICATIONS
1,182,409  11/1964  Germany .................... 165/63

Primary Examiner—Albert W. Davis, Jr.
Assistant Examiner—Daniel J. O'Connor
Attorney, Agent, or Firm—Frederic M. Bosworth

[57] ABSTRACT

A controlled refrigerated storage environment conducive to preservation of stored respiring food tissue or other respiring matter is produced, without the use of closed cycle refrigeration, by expanding atmospheric air and raising its relative humidity by passing it through a body of water while heating the body of water (except when the cooling demand exceeds the cooling capacity of the equipment) so that the air is cooled by its expansion and by evaporation of said water only to a preservation-conducive temperature (higher than the capacity of the equipment with that pressure drop at that rate of flow in the absence of such heating) and flowing the cooled expanded water-saturated air around the stored matter to sweep away gaseous products of metabolic reaction emitted from said matter. Heat input to the water is made responsive to cooling of the air in the vacuum chamber below a preservation conducive temperature level and may be via an electric resistance element, e.g., immersed in the body of water, by heat exchange from an oil, water or air cooling system of a vacuum pump which serves as the air expansion means or from atmospheric air.

13 Claims, 3 Drawing Figures

LOW PRESSURE STORAGE OF METABOLICALLY ACTIVE MATERIAL WITH OPEN CYCLE REFRIGERATION

This is a division, of application Ser. No. 215,688 filed Jan. 5, 1972 now U.S. Pat. No. 3,810,508.

This invention relates to the refrigerated preservation of respiring tissue, such as fruits, vegetables, flowers, foliage, and other plant material, including bananas as well as meat and other desirably preserved organic matter.

An object of the invention is to produce efficiently a beneficial preservation atmosphere in which the tissues can be stored, taking into account all the factors of temperature, pressure, relative humidity, metabolic oxygen demand and disposal of gaseous metabolic effluents.

A method for creating one type of such an atmosphere is disclosed in U.S. Pat. No. 3,333,967 issued to one of us (Burg), wherein a suitable pressure, saturated water content and means for disposing of gaseous metabolic effluents were provided by the use of a flow-through vacuum chamber, the internal temperature of which was controlled by an independent closed circuit (closed cycle) refrigerating system.

It has now been found that by applying an open cycle system of refrigeration to a water saturated air flow-through vacuum chamber system operating at rates of air flow and hypobaric pressures (preferably 25–400 mm. Hg) conducive to tissue preservation, an air cooling capacity can be created which is more than sufficient, consequent to expansion of the air and evaporation of water, to care for operation at optimal internal temperatures of 32° F. or above even when encountering the maximal expected temperatures of ambient air input, say up to 120° F. Closed cycle refrigeration and its attendant weight and cost may be is completely or partially eliminated as operating conditions may permit or require.

Very simple means may then be incorporated to permit operation at any lower ambient temperature, while still maintaining the preferred rate of flow and internal pressure.

Such temperature regulation is readily accomplished in its simplest form by regulating heat input to the body of saturating liquid from a chamber temperature sensor so that whenever the required internal temperature is higher than would be present with application of the full cooling effect at the given rate of flow and pressure, the cooling effect is overriden to the extent required to attain and maintain optimal internal air temperature, throughout the whole range of ambient temperature from 120° F. down to −20° F. or lower.

Such heat input may be provided by an electric resistance heater placed in the body of saturating liquid or alternatively, by heat exchange thereof with the oil cooling system of an oil seal vacuum pump or the air or water cooling system of a water pump which creates the internal partial vacuum in the preserving chamber or with atmospheric air.

Apparatus in accordance with the invention is shown in the accompanying drawings wherein.

Figure 1:
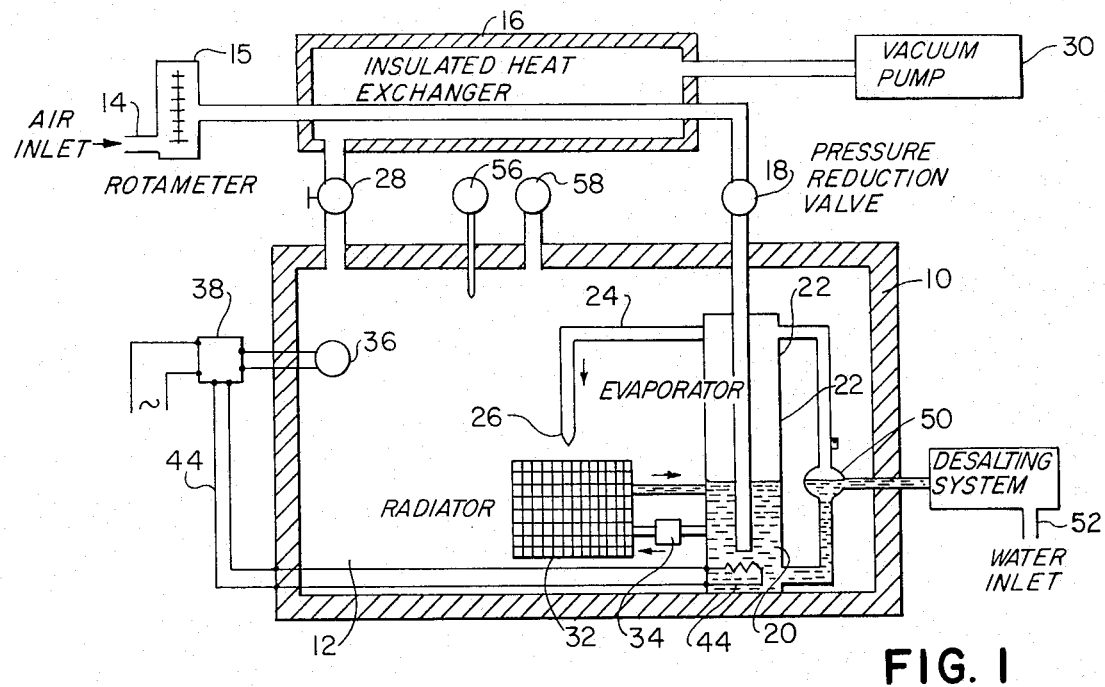
FIG. 1 is a diagrammatic cross-sectional view of a vacuum storage system in accordance with the invention.

FIG. 1 shows insulated walls 10 forming a vacuum chamber 12. An ambient air inlet 14 leads through a rotameter 15 for measuring air flow into an insulated heat exchanger diagrammatically shown at 16, through an air pressure reducing element shown as a regulating valve 18 and thence downwardly below the level of a body of vaporizable liquid 20 contained in a tank or tower forming an evaporator 22 which has an outlet 24 connected to its top terminating in a Venturi nozzle 26.

Air leaves the vacuum chamber through a valve 28 which controls the rate of air flow and is discharged into the heat exchanger 16 and thence to the vacuum pump 30.

The tapered nozzle 26 discharges towards a radiator 32 through which is circulated liquid from the body of liquid 20 in the evaporator 22 as by a pump 34.

A temperature sensor 36 is positioned adjacent the chamber outlet and is connected in a control circuit including a relay 38 which opens and closes electrical circuit 40 in which is included an electrical resistance heating element 44 positioned in the lower part of the evaporator 22.

A liquid replenishing system and liquid level control is indicated generally at 50. This can be a normal float bowl which opens the valve to a water inlet 52 to maintain a proper level of water in the evaporator 22. A desalting system is indicated at 54 which can be a Culligan reverse osmosis membrane filter followed in series by a mixed bed ion exchange resin. The water inlet is preferably under pressure but if only a reservoir is available, a booster pump may be inserted to provide the reverse osmosis filter with at least 40 p.s.i. water pressure.

The pressure reduction valve 18 has a range of 0–760 mm. Hg but for produce storage is set to operate in the range from 25–400 mm. Hg (where 760 mm. Hg is atmospheric pressure). Temperature and pressure gauges are shown at 56 and 58 respectively.

The vacuum pump 30 being in operation, air is drawn through the inlet 14 and through the insulated heat exchanger 16. As the incoming air passes across the valve 18, it expands and experiences a cooling effect.

Regardless of the initial relative humidity (R.H.) of the ambient air, the R.H. after crossing the pressure reduction valve is low because R.H. is decreased in direct proportion to the pressure drop, except that to some extent this is compensated for by the cooling effect. If further reduction in R.H. is desired to increase the refrigeration capacity, a heatless air dryer of a well-known commercial type can be installed at the inlet 14. Relatively dry air, now at a reduced pressure, passes down to the bottom of evaporator 22. The incoming air bubbles through the body of water 20, causing water to evaporate and raise the vapor pressure of water in the outlet air stream to nearly saturation at the specific air temperature. The vapor pressure of water is independent of the operating pressure within the vacuum tank and evaporator, but depends upon the temperature so that less water is evaporated at lower temperatures and the cooling efficiency becomes progressively lower as the temperature is reduced. The evaporation of water creates a cooling effect which causes the water remaining in the evaporator to decrease in temperature, and this water is pumped by the water circulating pump 34 to radiator 32. The air passing through the evaporator is cooled in transit by the cool water in the evaporator and in addition as it leaves the evaporator its velocity is increased by the tapered nozzle 26 which directs its flow across the radiator 34 where further heat exchange occurs. A tapered nozzle is preferred rather than a circulating fan because of the difficulty of operating a fan en vacuo where there is inadequate air resistance to limit the movement of the blades.

Air leaves the vacuum chamber and passes into the insulated heat exchanger 16 by way of the valve 28 which controls the rate of air flow. This valve is situated upstream of the heat exchanger 16 so that the pressure drop across the valve will produce an additional cooling effect in the heat exchanger. The valve can also serve to reduce the pressure at the vacuum pump inlet to approximately 30–40 mm. Hg, which in the case of an oil seal pump is ideal for venting water vapor from the oil. An oil seal vacuum pump is well suited for use when the container is carried on a flatbed trailer or railcar, but a water seal pump or other type might be preferable in a shipboard installation, or during use of the method at a stationary location.

The internal temperature of the vacuum chamber is regulated by heater 44 located in the evaporator. The heater is turned on and off responsive to sensor 36 and as required to maintain a desired temperature.

During a cooldown operation, the vacuum pump may be operated at maximum capacity to produce the full refrigeration effect, but after operating conditions are established and especially when an operating temperature above ambient is required in the vacuum chamber, this rate can be reduced by adjusting the regulating valve to restrict flow therethrough. When it is desired to operate under conditions which lower the temperature of the liquid body to 32° F. or lower, the liquid body must have a correspondingly still lower freezing point, as by adding a non-volatile anti-freeze component to water. Where there is excess cooling caused by a low ambient temperature, the heater must have sufficient capacity to raise the temperature of the incoming ambient air and overcome the ever present cooling effect of the vacuum refrigeration system. On a heating cycle, the insulated heat exchanger assists the heater just as it does the refrigeration system by conserving work accomplished.

Figure 2:
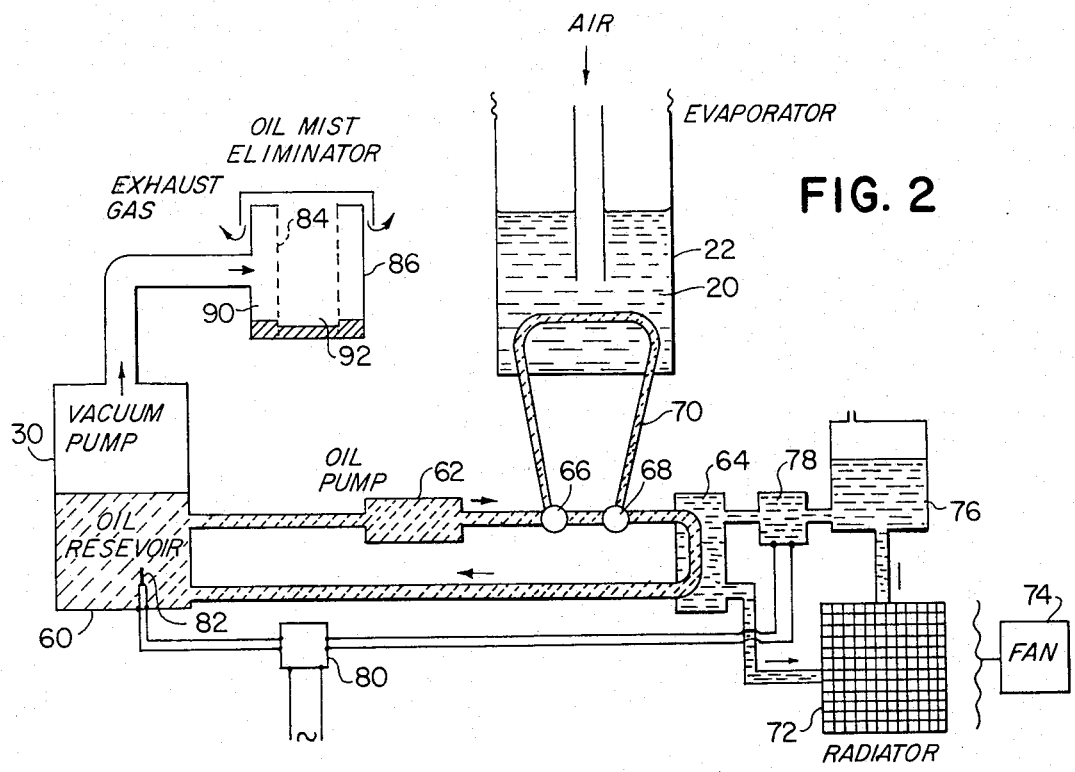
FIG. 2 is a similar diagrammatic view of a portion of the system shown in FIG. 1 but utilizing a different and alternative form of heat input.

In FIG. 2, an oil seal pump is used to produce the vacuum. The pump oil then serves as the heat source. Oil from the vacuum pump oil reservoir 60 is sucked from the vacuum pump by oil pump 62 and forced into a heat exchanger 64 passing through two solenoids 66, 68 which can direct the flow toward the heat exchanger 64 until the temperature sensing element (36 in FIG. 1) calls for heat input. When this happens, the hot oil is directed by the solenoids, actuated from the sensor, through a pipe 70 which passes through the body of water 20 in the evaporator 22, thus heating the water in the evaporator. In the heat exchanger 64, the oil is reduced in temperature before returning to the vacuum pump reservoir 60. The heat is transferred in 64 to water and dissipated in a radiator 72 cooled by fan 74. Leaving the radiator the water returns to a reservoir 76 from which it is pumped by a water pump 78 to the heat exchanger 64. The water pump 78 is actuated by a relay in a control unit 80, which in turn is actuated by a temperature sensing probe 82 located in the oil reservoir. In this way, the oil temperature can be maintained at about 145°–150° F., the most favorable temperature for venting water from the oil since higher temperatures accelerate oil decomposition and breakdown of the filter element 84 in the oil mist eliminator 86 associated with the vacuum pump 30. The mode of operation of the pump, with an inlet pressure of about 30–40 mm. Hg, an oil temperature of 145°–150° F. and a continual bleed of air ensures that the water vapor can be effectively exhausted by the vented exhaust oil seal pump.

If a water seal pump is employed, a heat exchanger can transfer the heat from the sealing water to some other cooling medium (water, air, or some other fluid). The exchanged heat may then be used to supply heat to the evaporator by means analogous to those illustrated for the oil of an oil seal pump in FIG. 2. Other types of vacuum pumps also produce heat during operation, which may be used for heating the evaporator.

Figure 3:
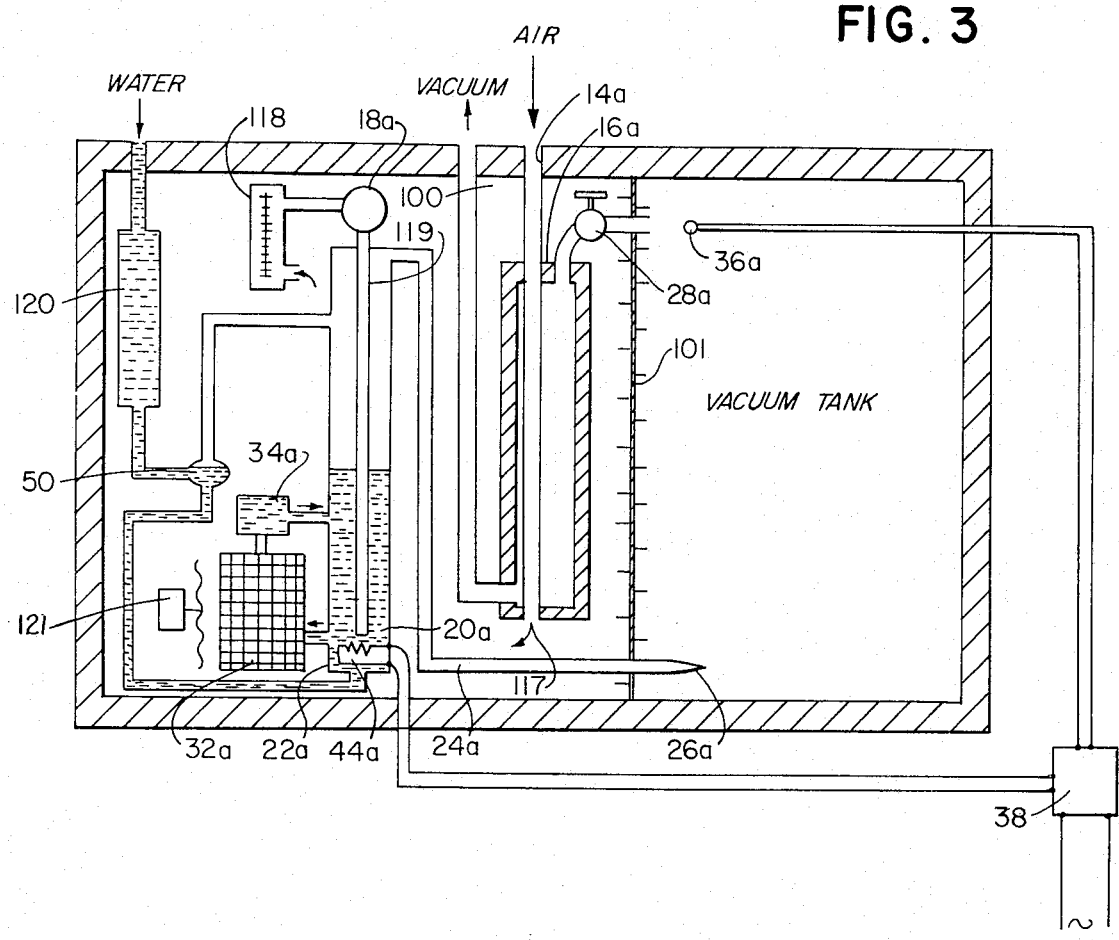
FIG. 3 is a diagrammatic cross-sectional view of a system similar to that shown in FIG. 1 except that the evaporator and other elements are located outside of the vacuum chamber instead of inside as shown in FIG. 1.

An alternative vacuum refrigeration system, in which all components are located external to the vacuum tank, is illustrated in FIG. 3. The control equipment is all located in an air tight insulated space 100 separated by a heat-transmitting finned wall 101 from the insulated vacuum chamber, included as an integral part of the container. Ambient air enters at inlet 14a and passes through a heat exchanger 16a. Its temperature is lowered or raised depending upon whether the system is heating or cooling. The air then exits at 117 to circulate freely in space 100 containing the equipment and enters the rotameter 118, from whence it passes across pressure regulating device 18a which reduces the pressure to 25 to 250 mm. Hg. This produces a cooling effect, and also lowers the R.H. of the air. The air then flows through pipe 119 to the bottom of the evaporator 22a and bubbles through the body of water 20a contained in the evaporator. The evaporation of water saturates the air at the specific temperature prevailing in the evaporator and produces a cooling effect during this operation. The air is then lead through conduit 24a and enters the vacuum tank through a tapered nozzle 26a which increases its flow rate producing marked circulation in the tank. Air exits from the tank, passing through flow regulating valve 28a into the heat exchanger 16a where it assists in cooling (or heating) the incoming ambient air. As the air crosses valve 28a the pressure reduction produces a further cooling effect which is also transmitted to the incoming air. Water from the evaporator 22a is circulated through a radiator 32a by means of a water pump 34a. A fan 119 forces air across the radiator 32a and thus cools or heats the air in the instrument compartment before it enters 118. The water entering the evaporator 22a is desalted at 120 and kept at an appropriate level by float 50 as described for FIG. 1. The temperature sensing element 36a is located at the outlet of the vacuum tank and regulates heat input to the heater situated in water body 20a. Relay 38 actuates the heating element 44a, as in FIG. 1.

A model system of the FIG. 1 apparatus, not including the heater or the radiator system 32, 34, 24, produced a temperature differential of 38° F. within a few hours and maintained it for three days at an ambient air temperature of 83° F. The system was operated at an internal pressure of 150 mm. Hg, and at a flow rate of 80 air changes per hour through a cylindrical vacuum tank having a total volume of 2.3 liters. After bubbling through the water, the air was directed downwardly over the evaporator by a cap overlying the open top of the evaporator. Water lost by evaporation was supplied manually through a needle valve. Insulation used was minimal; about ¼ inch thickness of dacron polyester covered the vacuum tank and the same thickness of cotton was used on the inlet heat exchanger. With better insulation and a larger unit having a more advantageous surface to volume ratio, calculations demonstrate that the same or still greater differentials can be obtained with fewer air changes.

Particular use for such apparatus is in the storage and transportation of green bananas which benefit by storage at approximately 58° F. with about one change of air per hour. Full cooling capacity should thus be sufficient, for banana storage, to maintain a differential temperature of up to 62° F. at 120° F. ambient air temperature with increasing heat input capacity for each degree reduction of ambient air temperature up to a total heat input capacity to maintain a differential temperature of 78° F. at −20° F. ambient temperature, based on ambient air temperatures which are likely to be encountered during shipment from the tropics to northern cities in winter time.

What is claimed is:

1. The method of open cycle conditioning of the interior of a closed chamber comprising flowing outside atmospheric air into the interior of said chamber while reducing its pressure and contacting it with a body of water to provide a cooling capacity consequent to expansion of said flowing air and evaporation of said water and, while maintaining both the rate of flow of air and pressure drop at selected constant values to provide cooling capacity in excess of that required to maintain the internal temperature of said chamber at a desired temperature, controlling the temperature of the flowing air in said chamber by heating said air and said body of water.

2. The method as claimed in claim 1 wherein the selected value of flow is sufficient to cause at least one change per hour of air in said chamber.

3. The method as claimed in claim 2 wherein the pressure has a value in the range of 25-400 mm Hg.

4. The method as claimed in claim 1 wherein the closed chamber contains green bananas and the internal temperature of the chamber is maintained at approximately 58°F.

5. The method as claimed in claim 1 wherein the temperature of the air in said chamber is controlled by heating said flowing air responsive to any drop in said internal temperature below said desired temperature.

6. The method of conditioning a storage chamber for preserving food, plants and the like comprising,
maintaining sub-atmospheric pressure in said chamber,
admitting air to said chamber and reducing the pressure of said air that flows into said chamber and expands,
maintaining a supply of water,
contacting said air and water,
evaporating said water and humidifying said air,
cooling the contents of said chamber by the expansion of said air and evaporation of said water, and
heating said water.

7. The method of claim 6 with the step of maintaining a desired temperature in said chamber by balancing said cooling and heating.

8. The method of claim 6 with the step of exchanging heat between the air being admitted to said chamber and air leaving said chamber.

9. The method of claim 6 with the step of maintaining said sub-atmospheric pressure below 100 mm Hg.

10. The method of claim 9 with the step of maintaining the temperature in said chamber as low as 32° F.

11. The method of claim 6 with the step of maintaining the temperature in said chamber as low as 32° F.

12. The method of conditioning a storage chamber for preserving foods, plants and the like comprising,
maintaining a sub-atmospheric pressure in said chamber
providing a space adjacent said chamber and separated therefrom.
maintaining a supply of water in said space
introducing air at atmospheric pressure into said space and contacting said air and water therein,
evaporating said water and humidifying said air,
conducting said humidified air from said space into said chamber,
reducing the pressure of said humidified air that flows into said chamber and expands,
cooling the contents of said chamber by the expansion of said air and evaporation of said water, and
heating said water.

13. The method of claim 12 wherein said space is enclosed, with the step of heating said air in said space.

* * * * *